Patented July 16, 1940

2,207,915

UNITED STATES PATENT OFFICE 2,207,915

HEPTAMETHINE DYESTUFFS

Walter Dieterle and Oskar Riester, Dessau-Ziebigk, Germany, assignors, by mesne assignments, to General Aniline & Film Corporation, New York, N. Y., a corporation of Delaware No Drawing. Application October 16, 1937, Serial No. 169,458. In Germany October 23, 1936

12 Claims. (Cl. 260—240)

This invention relates to heptamethine dyestuffs.

One of its objects is to provide a process of producing new heptamethine dyestuffs. Another object is to provide the new dyestuffs themselves. Further objects will be seen from the following detailed specification.

According to the invention the hitherto unknown heptamethine dyestuffs are produced by causing a trimethine aldehyde of the general formula

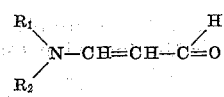

wherein

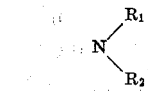

stands for the radical of a secondary aromatic amine or the radical of a secondary cyclic amine, to react with malonic acid in the presence of an acid condensing agent.

The trimethine aldehyde which is the parent product may be a derivative of mono-alkylaniline, tetrahydroquinoline, dihydro-$\alpha$-alkyl-indol, $\alpha$-alkylphenomorpholine or the like and may be produced analogous to the manner as described in German specification No. 218,616 and by Zincke in "Liebig's Annalen der Chemie," 338, 127, as indicated in Example 3.

Suitable condensation agents are, for example organic or inorganic acids, preferably in presence of an organic anhydride. Suitable organic acids are, for instance, all lower fatty acids (formic acid, acetic acid, propionic acid, etc.). The heptamethine dyestuffs produced may be said to have the general formula

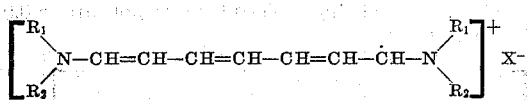

wherein

stands for the radical of secondary amines or the radical of cyclic amines, and X is any acid residue.

In the foregoing reaction it is quite surprising that with the aid of malonic acid there is produced the coupling of two molecules of aldehyde. It will have been expected that the malonic acid would react with one molecule of aldehyde with the elimination of water and one molecule of carbon dioxide. With the aid of the foregoing reaction the polymethine chain may be lengthened from three to seven methine groups.

The course of the reaction may be supposed to be as follows:

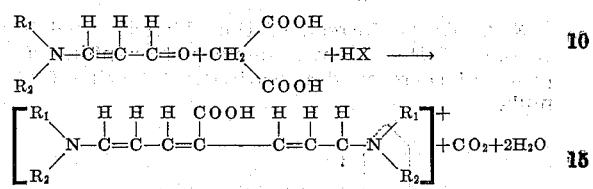

But another reaction also proceeds: from the carboxyl group existing in the polymethine chain carbon dioxide is eliminated. There is produced therefore a heptamethine dyestuff which is not substituted in the chain:

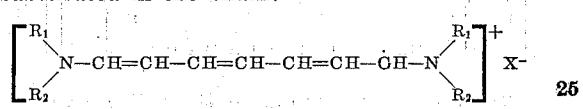

Which of the two possible dyestuffs is produced in preponderance has not been decided. What is of importance is that the new reaction offers a process for producing valuable new products.

Preferably the dyestuff formed is converted into a halide, for example by addition of potassium bromide or potassium iodide to the mixture when the dyestuff formation is at an end.

Violet products are obtained which are themselves dyestuffs and are suitable, for example, as filter dyestuffs.

The following examples illustrate the invention:

*Example 1.*—0.6 gram of the aldehyde tetrahydroquinoline-N-propenal corresponding with the formula

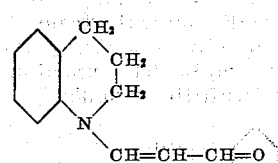

and 0.6 gram of malonic acid are dissolved together in 6 cc. of glacial acetic acid at about 60° C. When the solution is complete 2 cc. of acetic anhydride are added and the mixture is retained for 12 minutes at about 60° C. After this time 8 cc. of methanol are added and the whole is boiled for 10 minutes (for the purpose of destroying the larger part of the acetic anhydride). To the warm solution 3 cc. of aqueous potassium bromide solution of 30 per cent strength are added, followed by drops of water until crystallization begins, which can be recognized by the appearance on the glass wall of a steel blue efflorescence. The crystallization is completed by cooling with ice for 1–2 hours. Finally the mass is filtered and the dyestuff washed with a mixture of ether and alcohol and finally with ether. It is a dark powder. The yield is 0.1–0.2 gram of the crude dyestuff.

This crude dyestuff can be recrystallized from alcohol to which some glacial acetic acid has been added. It is then a steel blue mass of felted crystals.

The new dyestuff in methanol solution has an absorption maximum at 5950 Å. U.; color: violet. The structural formula is

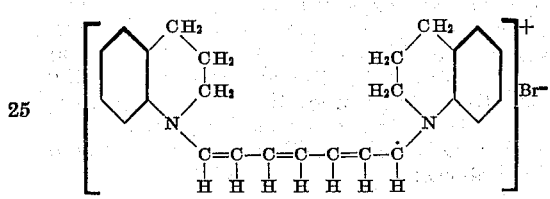

*Example 2.*—Instead of the aldehyde used in Example 1 the aldehyde mono-methylaniline-N-propenal corresponding with the following formula

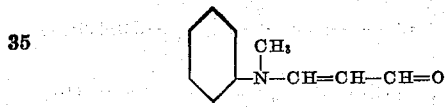

is used in this example. The dyestuff produced has the formula

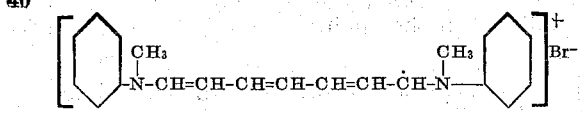

*Example 3.*—100 grams of the yellow dyestuff having the formula

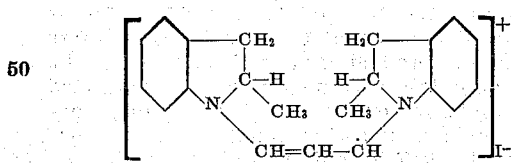

(produced by causing dihydro-α-methyl-indol to react with propargylaldehyde acetal, hydrochloric acid and potassium iodide analogous to the synthesis described by Claisen in "Berichte der deutschen chemischen Gesellschaft," 36, 3667) are dissolved in 500 cc. of methanol. To the boiling solution 25 grams of sodium carbonate (siccum) dissolved in 200 cc. of water are added. By means of a distillation with steam at first methanol and then dihydro-α-methyl-indol are obtained as distillates. The remaining aldehyde corresponding with the formula

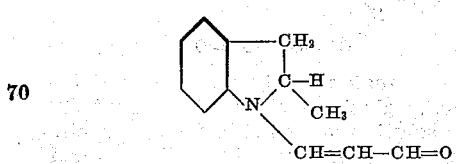

is extracted by benzene; brownish-yellow crystals (M. P. 103° C.) are obtained. 10 grams of the aldehyde thus produced are dissolved in 25 cc. of glacial acetic acid. To this solution 6 cc. of acetic anhydride are added and the mixture is retained at about 50° C. Finally 3 grams of malonic acid are added in rations. The liquid is colored a strong blue green, then a pure blue. When the formation of the dyestuff is complete an aqueous solution of sodium perchlorate is added. An oil is formed which solidifies by intense cooling. The dark violet powder thus obtained is a heptamethine dye having the formula

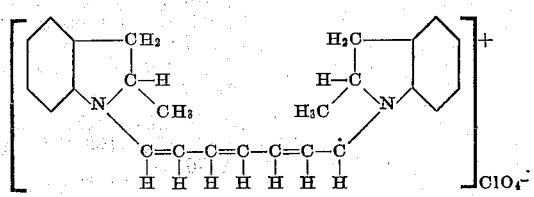

*Example 4.*—Instead of the aldehyde used in Example 1 the aldehyde α-methylphenomorpholine-N-propenal corresponding with the formula

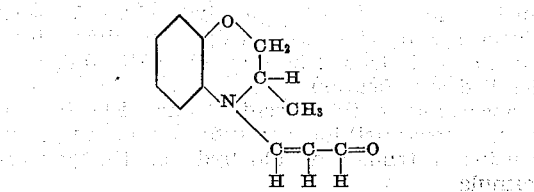

is caused to react in this example. The dyestuff thus obtained has the following formula

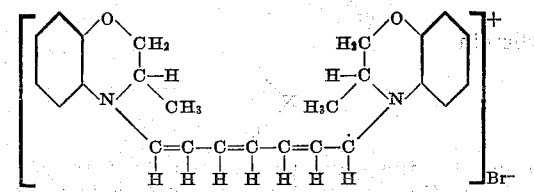

What we claim is:

1. A process of producing heptamethine dyestuffs comprising causing trimethine aldehydes selected from the class consisting of mono-alkylaniline-N-propenal, tetrahydroquinaline-N-propenal, dihydro-α-alkyl-indol-N-propenal and α-alkylphenomorpholine-N-propenal to react with malonic acid in the presence of an acid condensing agent.

2. A process of producing heptamethine dyestuffs comprising causing trimethine aldehydes selected from the class consisting of mono-alkylaniline-N-propenal, tetrahydroquinoline-N-propenal, dihydro-α-alkyl-indol-N-propenal and α-alkylphenomorpholine-N-propenal to react with malonic acid in the presence of an acid and acetic anhydride.

3. A heptamethine dyestuff corresponding with the formula

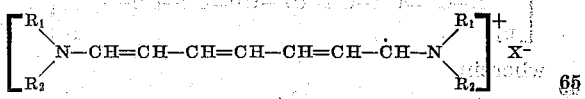

wherein

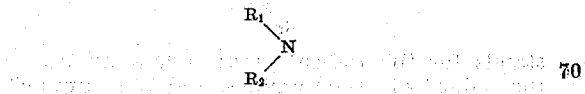

is selected from the class consisting of mono-alkylaniline, tetrahydroquinoline, dihydro-α-alkyl-indol, and α-alkylphenomorpholine and X is an acid radical.

4. A process of producing a heptamethine dyestuff corresponding with the formula

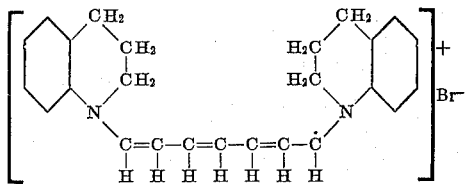

comprising causing a trimethine aldehyde corresponding with the formula

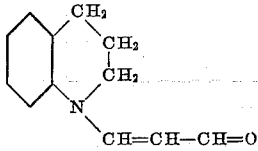

to react with malonic acid, glacial acetic acid, acetic anhydride and potassium bromide.

5. A process of producing a heptamethine dyestuff corresponding with the formula

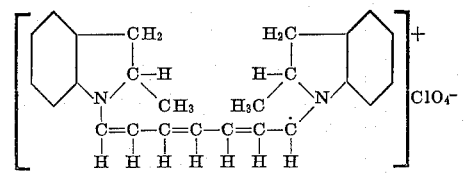

comprising causing a trimethine aldehyde corresponding with the formula

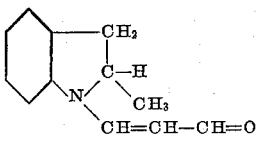

to react with malonic acid, glacial acetic acid, acetic anhydride and sodium perchlorate.

6. A process of producing a heptamethine dyestuff corresponding with the formula

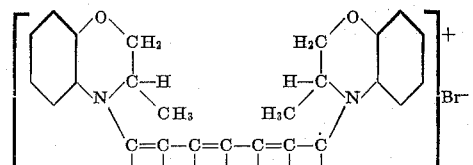

comprising causing a trimethine aldehyde corresponding with the formula

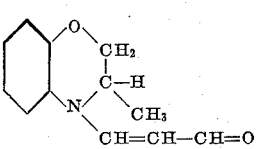

7. A heptamethine dyestuff corresponding with the formula
to react with malonic acid, glacial acetic acid, acetic anhydride and potassium bromide.

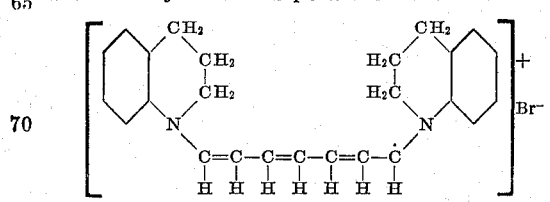

8. A heptamethine dyestuff corresponding with the formula

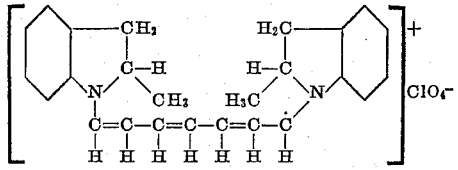

9. A heptamethine dyestuff corresponding with the formula

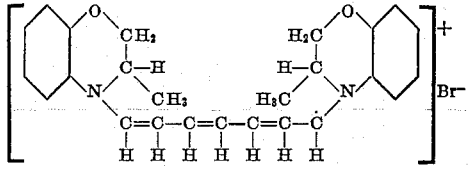

10. A process of producing heptamethine dyestuffs corresponding with the general formula

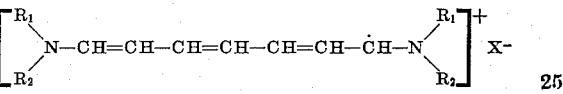

wherein $R_1$ is a member selected from the class consisting of aryl and arylene and $R_2$ is a member selected from the class consisting of alkyl and alkylene, said arylene and said alkylene being linked to form a hydrogenated ring system, X is an acid radical comprising causing a trimethine aldehyde corresponding with the formula

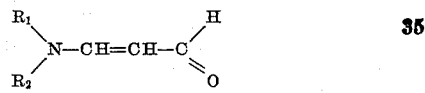

to react with malonic acid in the presence of an acid condensing agent.

11. A process of producing heptamethine dyestuffs corresponding with the general formula

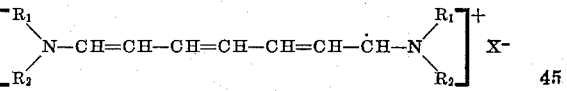

wherein $R_1$ is a member selected from the class consisting of aryl and arylene and $R_2$ is a member selected from the class consisting of alkyl and alkylene, said arylene and said alkylene being linked to form a hydrogenated ring system, X is an acid radical comprising a trimethine aldehyde corresponding with the formula

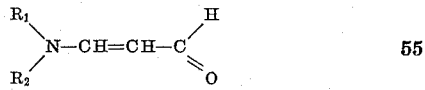

to react with malonic acid in the presence of an acid and acetic anhydride.

12. A heptamethine dyestuff corresponding with the general formula

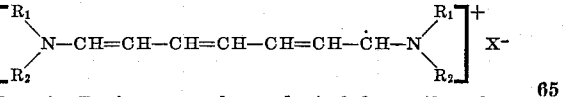

wherein $R_1$ is a member selected from the class consisting of aryl and arylene and $R_2$ is a member selected from the class consisting of alkyl and alkylene, said arylene and said alkylene being linked to form a hydrogenated ring system, X is an acid radical.

WALTER DIETERLE.
OSKAR RIESTER.

CERTIFICATE OF CORRECTION.

Patent No. 2,207,915.                                                July 16, 1940.

WALTER DIETERLE, ET AL.

It is hereby certified that error appears in the printed specification of the above numbered patent requiring correction as follows: Page 3, first column, lines 64 and 65, claim 7, strike out the words and period "to react with malonic acid, glacial acetic acid, acetic anhydride and potassium bromide." and insert the same after the formula ending in line 60, claim 6; and that the said Letters Patent should be read with this correction therein that the same may conform to the record of the case in the Patent Office.

Signed and sealed this 17th day of September, A. D. 1940.

Henry Van Arsdale,
                                             Acting Commissioner of Patents.

(Seal)